United States Patent [19]

Thamphald

[11] Patent Number: 5,555,964
[45] Date of Patent: Sep. 17, 1996

[54] POWER TRANSMISSION, PARTICULARLY FOR AN ADJUSTING DEVICE

[75] Inventor: Rolf Thamphald, Beuren, Germany

[73] Assignee: bielomatik Leuze GmbH & Co., Germany

[21] Appl. No.: 346,627

[22] Filed: Nov. 30, 1994

[30] Foreign Application Priority Data

Dec. 18, 1993 [DE] Germany ............... 43 43 323.5

[51] Int. Cl.⁶ ..................................................... F16D 7/08
[52] U.S. Cl. ............................................................ 192/145
[58] Field of Search ........................... 192/144, 145; 74/665 GE

[56] References Cited

U.S. PATENT DOCUMENTS

| | | | |
|---|---|---|---|
| 2,101,117 | 12/1937 | Weston | 74/665 GE X |
| 3,217,852 | 11/1965 | Brown et al. | |
| 4,579,201 | 4/1986 | Tiedeman | 192/144 X |
| 5,020,649 | 6/1991 | Eastcott | |

FOREIGN PATENT DOCUMENTS

| | | |
|---|---|---|
| 2070533 | 9/1971 | France. |
| 2942737 | 5/1981 | Germany. |
| 3305006 | 10/1984 | Germany. |
| 3600155 | 9/1986 | Germany. |
| 3714430 | 11/1988 | Germany. |
| WO85/04223 | 9/1985 | WIPO. |
| WO87/03943 | 7/1987 | WIPO. |

*Primary Examiner*—Rodney H. Bonck
*Attorney, Agent, or Firm*—Quarles & Brady

[57] ABSTRACT

A power transmission for a servodrive or the like has for the connection of a spindle nut with a structure an overload clutch operating in dwell-free manner and for the fixing of the structure a stopping device, so that the overload clutch releases the drive transmission despite the adjusting spindle continuing to run in the case of a path-dependent controlled stopping of the structure. The clutch can also be used as a self-engaging overload clutch for the transmission of driving torques.

31 Claims, 3 Drawing Sheets

POWER TRANSMISSION, PARTICULARLY FOR AN ADJUSTING DEVICE

BACKGROUND OF THE INVENTION

The invention relates to a power transmission having one or more clutches in such a way that the driven part is delayed with respect to the driving part in a substantially non-slip synchronous run or can be completely stopped despite a continuously further running driving part. Thus, with the driving part several driven parts can be driven and delayed or stopped independently of one another.

The construction according to the invention is particularly suitable for the transmission of low forces or driving torques, such as occur in adjusting devices, which are used for the positioning or position-adjustment of units, e.g. the working units of machines. Such working units are initially set up without working engagement and are only brought into the latter in the set and optionally fixed position. For a precise setting it is advantageous if the power transmission or the unit in the regulating movement can be interrupted or stopped substantially free from any delay or transition, e.g. in such a way that the frictional or mass forces have no effect and the unit, despite the interruption of the power transmission, still lags over a delay path.

Independently of its use, the clutch must be constructed in the manner of an overload protector responding to a driving torque, so that the driving torque transferred by it for release purposes does not, in the manner of a locking clutch, briefly significantly rise and instead has at the most a limited or no rise or with response immediately decreases in a substantially transition-free manner.

In the case of machines for machining flat substrates or webs, such as paper, cardboard, etc., the latter are e.g. drawn continuously from storage reels and subdivided into individual units, e.g. Juxtaposed running longitudinal webs and/or successively running individual layers, the most varied working units, such as devices for producing cuts, grooves, perforations, for separating or flush abutment of adjacent or stacked individual units, for longitudinal and/or transverse supply of substrate strips, for conveying, cambering, stop limitation or the like are usable and in each case act on a single unit or simultaneously on a plurality of such units, which are e.g. connected to one another in a ragged flow or in reciprocal engagement in a strand. These devices usually operate in the area of longitudinal edges or borders of the substrate web parallel to the running direction and are settable or adjustable for format change. purposes transversely to the running direction and roughly parallel to the running plane, a setting accuracy of below 2 or 1 or ½ mm being advantageous.

If the adjusting device has an adjusting spindle with an adjusting nut and the latter is fixable with respect to the working unit with a clamping device, as well as being releasable for free rotation with the spindle, during release and as a result of its inertia it requires an acceleration time until it rotates synchronously with the adjusting spindle and consequently no longer transfers an adjusting movement. This can lead to a significant reduction in the adjusting accuracy. The situation is similar with respect to delays on fixing the spindle nut relative to the working unit. In the case of a released and synchronously rotating spindle nut no adjusting force acts on the working unit, so that a resetting of the adjustment position of the working unit is only possible by again fixing the spindle nut. However, if the spindle nut is not released as a result of a malfunction, then on the working unit the adjusting force continues to act in the manner of a positive drive if said working unit runs up onto an obstacle, e.g. a machine frame and considerable damage can occur.

OBJECTS OF THE INVENTION

An object of the invention is to provide a power transmission, particularly an adjusting device of the aforementioned type, in which the disadvantages of known constructions are avoided and advantages of the described type are obtained or further improved and which in particular with a simple construction permits a sudden delay or stoppage of the driven unit.

SUMMARY OF THE INVENTION

According to the invention, for the reduction or interruption of the movement of the driven part a loading device counteracting said movement or the transmitted force is provided and which transfers the clutch into a state in which the driving torque transmitted by it is significantly reduced, e.g. merely to a sliding friction, merely to a rolling friction, or to a combination thereof. In a clamping device of the described type this could e.g. be achieved in that the clamping force for the transmission of the adjusting movement is sufficiently high, but is set so low that under the action of a resistance moment higher than the adjusting moment the clamping faces slide on one another, so that the spindle nut rotates despite the engagement of the clamping faces with the adjusting spindle. For as long as the working unit performs its adjusting movement, the clamping faces can engage in one another with static friction and therefore overcome the remaining frictional forces counteracting the adjusting movement, whereas during a delay or stopping of the adjusting movement, without reducing the clamping pressure against one another, they perform a movement substantially exclusively in the power or force transmission direction, in which the driving torque which can be transmitted by them is much lower than in the case of static friction.

The clutch according to the invention can be constructed in the manner of an overload clutch or drive damping means solely as a function of a predetermined maximum or minimum driving torque in self-engaging or self-disengaging manner, so that it need not be constructed as a clutch, in which by direct active control of clutch or coupling members it is necessary to change between an engaged and a disengaged state. The clutch members engaging in one another for power transmission purposes can therefore assume in all directions the same position at right angles to the movement direction belonging to the power transmission.

According to the invention the construction can be such that declutching takes place in substantially dwell-free manner and for the mutual acceleration of the interengaging clutch members it is not necessary that the driving torque transmitted by them briefly steeply rises or falls, independently of whether the acceleration is positive or negative. If e.g. the members transmitting the driving torque are roll bodies, such as balls, which in the engaged state so engage in depressions or holes of two clutch members that in the vicinity of the small circle ring zones they engage on the sharp edges of said holes, then the said balls on disengagement and initially under reciprocal axial moving apart of the two clutch members they must slide or roll over said edges, so that the transmitted driving torque briefly strongly rises and then abruptly falls. If the said edges are given a shallow rising configuration by rounding, chamfering, etc. or in the connecting surfaces are constructed in constantly transiting manner or if the roll bodies in the engaged state only engage in punctiform manner or linearly in an axial plane of their rolling axis, then on release the clutch does not have to overcome any dwell force acting in the sense of a driving torque and instead with the start of the release by reciprocal movement of the clutch members there is an immediate, sudden drop of the transmitted driving moment to a much lower value. The roll bodies can e.g. be guided on radially and/or axially substantially gradient-free bearing surfaces, so that in any random relative position of the two clutch members they can assume an engaged or a disengaged state.

The transmission members are advantageously adjacently provided in a row or a ring and are positionally secured against one another, so that they form a subassembly separate from one or both clutch members, which can be installed as a whole with the clutch members. For example, the transmission members can be positionally secured against one another by a cage body in opposition in the longitudinal or axial direction, transversely thereto in the radial direction and/or in the circumferential direction, the transmission member having with respect to the cage body in said direction a smaller movement clearance compared with its outside diameter or half the latter. Adjacent transmission members can have a reciprocal spacing smaller than three, two or one time the outside diameter thereof, so that it is possible to house in a confined space a relatively large number of transmission members and as a result the maximum transmittable driving torque is correspondingly increased.

Advantageously the transmission members are guided in substantially clearance-free manner with respect to transverse or radial movements and for this purpose e.g. the bearing surface of the particular coupling member can be constructed as a recessed channel, on which the transmission member engages in the case of a ball about the ball centre over an arc angle smaller than 180° or which is 90° or larger than the latter. In a very simple embodiment the clutch members including the transmission members are formed by a prefabricated, commercial thrust bearing, such as an axial grooved ball bearing, which merely comprises two races and a ring of roll bodies located between them and optionally a roll body cage. It is also possible to have two optionally identical rows or rings of transmission members reciprocally displaced in said directions for Joint power transmission purposes and which are e.g. formed by two separate, equiaxial bearings. The clutch can engage or disengage in any relative position of its clutch members with a substantially identical action, the transmission members remaining in engagement constantly between the bearing surfaces under the same clamp pressing. The latter is appropriately continuously adjustable with a setting device.

The loading or braking device is advantageously engageable over all or part of the adjusting path in continuous manner in each position for fixing the adjusting movement of the driven coupling part or drive unit. The braking or stopping device can be constructed as a clamping device, which is arranged separately and spaced from the clutch or coupling, so that it acts on the part driven by the latter. The adjusting movement is advantageously at right angles to the transmission movement of the clutch, e.g. parallel to its axis, the stopping device also being able to act as a stop with respect to this adjusting movement. As soon as the adjusting movement is fixed, without delay the clutch releases the slip-free or slip driving connection.

The control of the loading or stopping device can take place as a function of adjusting characteristics, such as an adjusting path, an adjusting time, etc., the particular adjusting characteristic being detected by a detecting device and on reaching a specific value the stopping device is engaged. For determining the adjusting path an in particular contact-free operating absolute displacement transducer with a position resolution of less than 1 or $1/10$ mm or approximately $1/100$ mm can be provided, which e.g. cooperates with a position indicator running along it together with the clutch or working unit and on reaching a given, randomly adjustable position emits a signal by which the stopping device suddenly engages.

One or more tools provided on the particular working unit are appropriately continuously adjustable independently of the adjusting device with respect to the body adjustable with the latter in one or more directions at right angles to one another and in accurate manner, the accuracy being at least as great as the adjusting accuracy of the adjusting device, and said setting directions can be set approximately parallel or at right angles to the adjusting movement of the adjusting device, to the working plane of the tool or to the running or position plane of the substrate or can be approximately horizontal or vertical.

BRIEF FIGURE DESCRIPTION

Apart from the claims, these and further features can be gathered from the description and drawings and the individual features, both singly and in the form of subcombinations, can be implemented in an embodiment of the invention and in other fields and can represent advantageous, independently protectable constructions for which protection is hereby claimed. An embodiment of the invention is described in greater detail hereinafter relative to the attached drawings, wherein show:

DETAILED DESCRIPTION OF A PREFERRED EMBODIMENT

Figure 1:
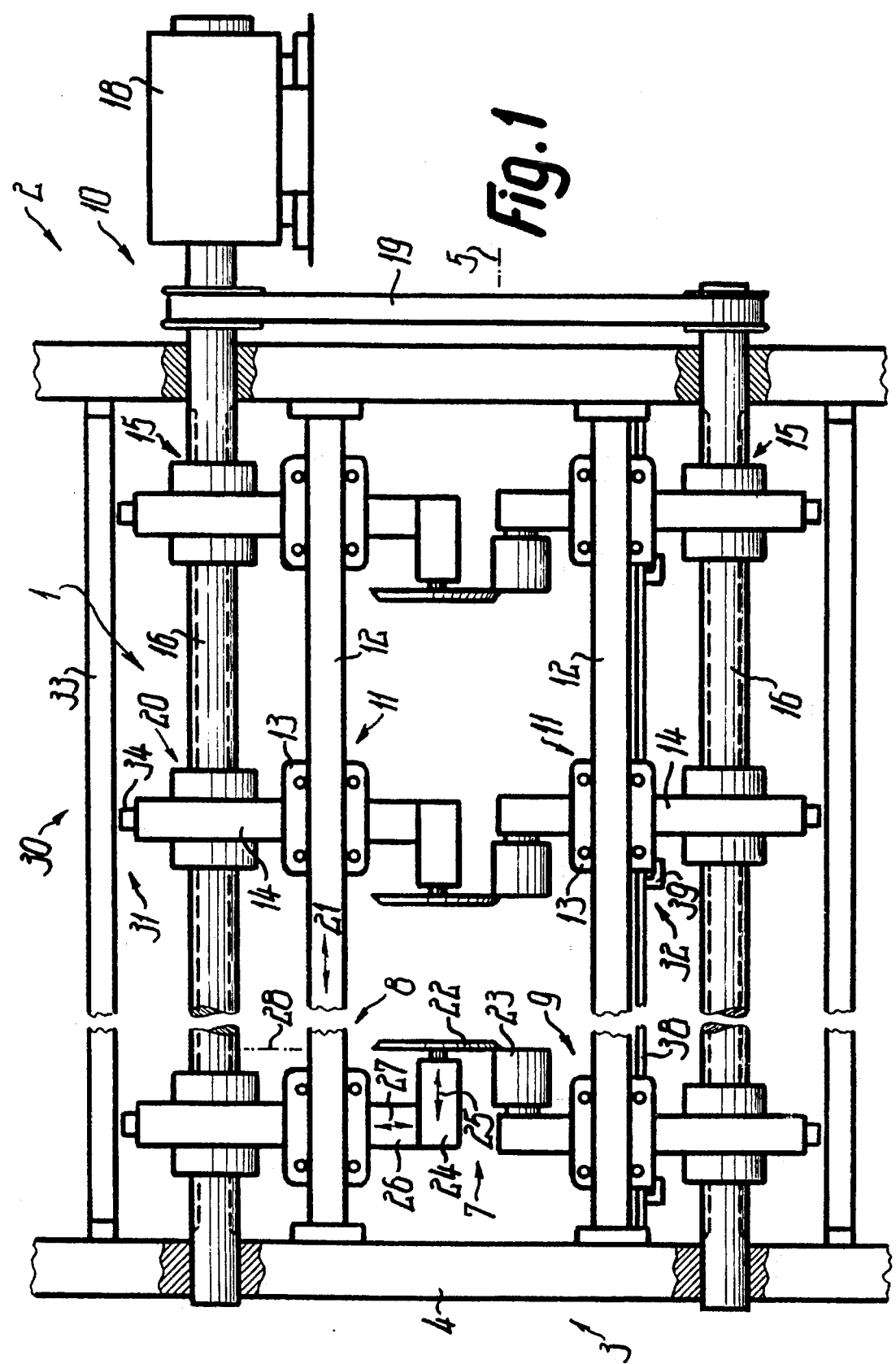
FIG. 1 shows a power transmission provided on the longitudinal cutter or slitter of a paper processing machine according to the invention in simplified form.
Figure 2:
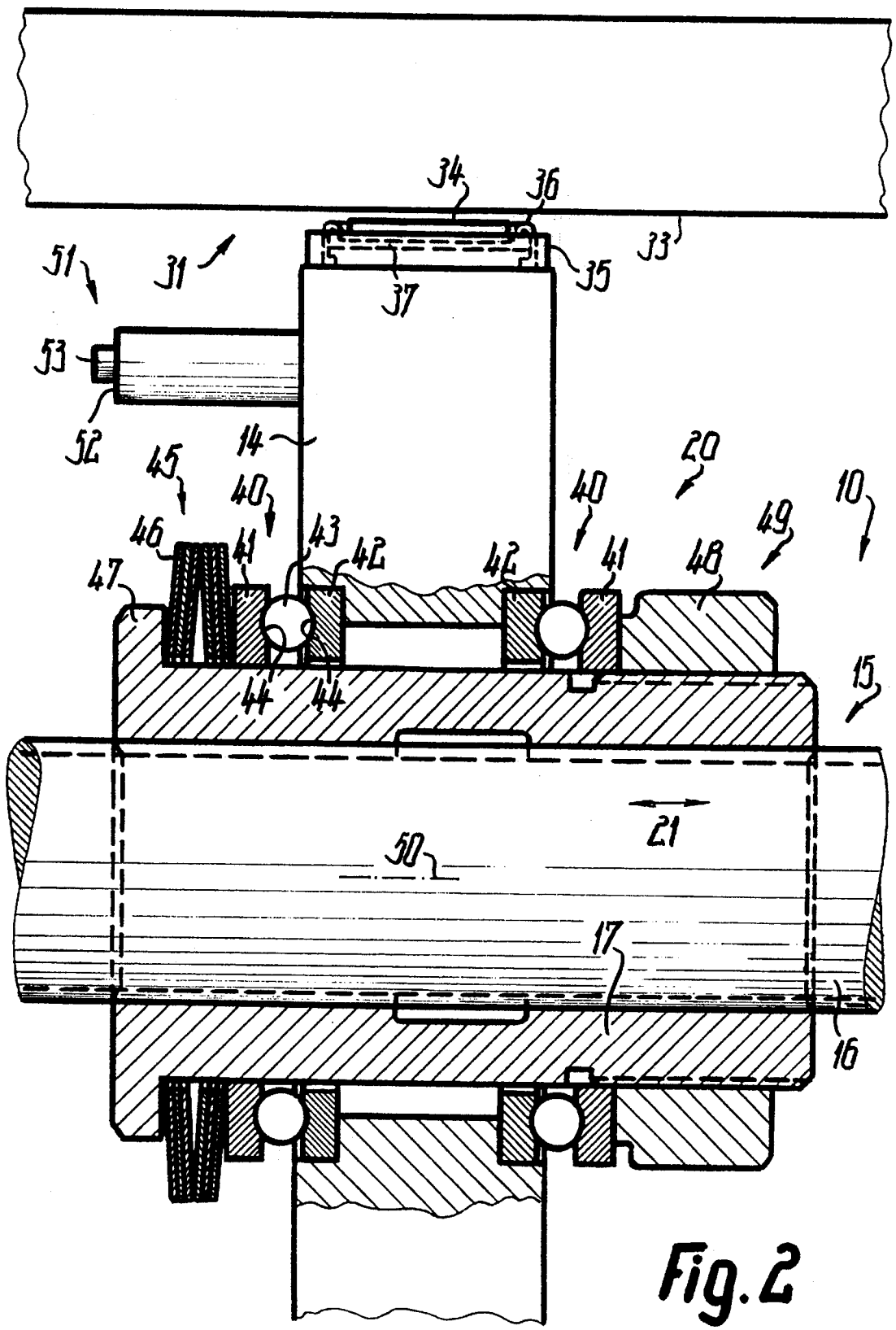
FIG. 2 shows a detail of FIG. 1 on a larger scale and in a sectional representation.

The power transmission 1 is provide for the multiple setting or adjustment of a machine 2, which on a fixed frame 3 or between its upright side walls or side plates 4 defines a working zone with a working plane 5 roughly horizontal in vertical section and a running direction 6 which is horizontal or parallel thereto. The machine is used for the processing of one or more superimposed paper webs in continuous passage between the side walls 4 and at right angles to the running direction and parallel to the working plane 5 there are several juxtaposed processing units 7 simultaneously in processing engagement and namely slitters or longitudinal cutters. Each processing unit comprises two separate working units 8, 9 forming closed subassemblies and in each case pairwise on either side of the working plane 5, namely an upper cutting unit 8 and a countercutting unit 9 below it.

The working units 8, 9 are adjustable or regulatable jointly and/or substantially independently of one another transversely to the running direction 6 or parallel to the working plane 5 using an adjusting device 10 along guides 11. For the at least two separate, identical or unidentical working units 8 on the associated side of the working plane 5 is provided a rail 12 extending over the entire working width or passing between the side plates 4 on which the particular working unit 8 is mounted in substantially clearance-free manner with a separate runner 13 transversely to the adjusting direction or to the running direction 6 at right angles thereto, parallel to the running direction 6 and/or parallel to the running plane 5 with roll bodies or rolls, so that, except in its adjusting direction the working unit 8 is substantially imovable as a whole. Correspondingly carriages 13 of the working units 9 are guided on an identical or unidentical rail 12 on the other side of the working plane 5, the two rails 12 being substantially congruent at right angles to the working plane 5.

The runner 13 or trolley is in each case rigidly connected to a structure 14 of the associated working unit 8, 9. The structure 14 is coupled or couplable to a control or adjusting drive 15 of the adjusting device 10 and for two to all the working units 8 there is a common, driven adjusting member, namely an adjusting spindle 16 and for two to all the working units 9 a common adjusting member 16 on the associated side of the working plane 5. In the associated adjusting spindle 16 parallel to the guide 11 engages here the working unit 8 or 9 with a separate adjusting runner 17 held in axial clearance-free manner on the structure 14 by springs in such a way that rotary driving movements of the adjusting spindle 16 lead to axially directed or at right angles thereto adjusting movements of the runner 17 and adjusting movements in the same direction of the associated working unit 8, 9. The adjusting member 16 and the working unit 8 or 9 can in each case be driven in both opposite directions. The adjusting member 16 is constructed as a threaded spindle, whereas the runner is formed by a solid spindle nut, whose internal thread can have an axial and/or radial clearance with respect to the external thread of the adjusting spindle 16, so that there is no need for a precision thread or a recirculating ball screw with a preloaded spindle nut.

The two adjusting spindles 16 are driven by means of a common servomotor, particularly a three-phase current servomotor coupled directly to an adjusting spindle 16 equiaxial to its drive shaft and without an intermediate gear and which is fixed to the outside of a side wall 4 and is so drive-connected to the other adjusting spindle by means of a drive connection 19, such as a single stage belt drive located on said outside, that both identically constructed adjusting spindles 16 can rotate with the same rotation speed and the same rotation direction.

In the force flow between the particular runner 17 and the associated structure 14 is positioned in the axis of the associated adjusting spindle 16 a clutch 20 constructed in the manner of an overload or safety clutch and which in the case of a counterforce of particular size acting counter to the adjusting movement or on ending the adjusting movement by stop abutment the transmission of the adjusting movement of the adjusting member 16 to the structure 14 is continuously reduced or interrupted in that the runner 17 is no longer stationary with respect to the structure 14 and instead runs in the same direction as the adjusting member 16 and consequently no longer performs any axial movement with respect thereto. As soon as the counterforce is reduced or eliminated, the runner 17 is automatically fixed again with respect to the structure 14 and the latter can be adjusted again with the still running adjusting spindle 16. Only the structure 14 exposed to the counterforce is stopped, whereas all the remaining structures are further adjusted by the still running adjusting spindle 16 until they are also stopped by the action of a counterforce.

On the structure 14 of the particular working unit 8 is mounted in rotary manner about a working axis in a driven working movement a tool 22, which can be positioned parallel to the adjusting direction 21 or at right angles to the running direction 6 or parallel to the working plane 5. On the structure 14 of the particular working unit 9 a countertool 23 is rotatably mounted about a working axis oriented in this way and which is in engagement with the tool 22 in machining operation. The tool 22 is an overhung, disk-like slitter, whose end face connected to a tool shaft is in engagement with the free end face of the roller-like, also overhung countertool 23, so that a paper web running over the roller circumference is cut in the manner of a rolling scissor cut into parallel, Juxtaposed longitudinal strips. Two to all the tools 22 can be driven by means of a not shown, common drive shaft. This drive shaft parallel to the adjusting device 21 and mounted in rotary manner on the side walls 4 positively carries in the rotation direction a drive runner of the associated working unit 8, which is rotatably mounted on the associated structure 14 and is longitudinally displaceable on the drive shaft, e.g. a key shaft with the working unit 8. This drive runner axially parallel to the tool 22 is e.g. drive-connected to the associated tool shaft by means of a one-step gear, such as a toothed gear or belt drive. Correspondingly two to all the countertools 23 can be drive-connected to a separate drive shaft and both drive shafts located on either side of the working plane 5 can be synchronously driven by a common drive motor.

Independently of the adjusting device 10 or the servodrive 15, each tool 22 can be regulated with separate regulating devices 24, 26 with respect to the associated structure 14 in regulating directions 25, 27, whereof one is parallel to the working or rotation axis or adjusting direction 21 of the adjusting device 10 and the other is at right angles thereto or to the working plane 5. Therefore with fixed structures 14 of the associated machining unit 7 the tool 22 can be precisely adjusted with respect to the associated countertool 23 and prior to the putting into operation of the adjusting device 10 can be retracted with respect to the working plane 5 and disengaged from the associated countertool 23. The working plane of two interengaging tools 22, 23 is designated 28.

Figure 3:
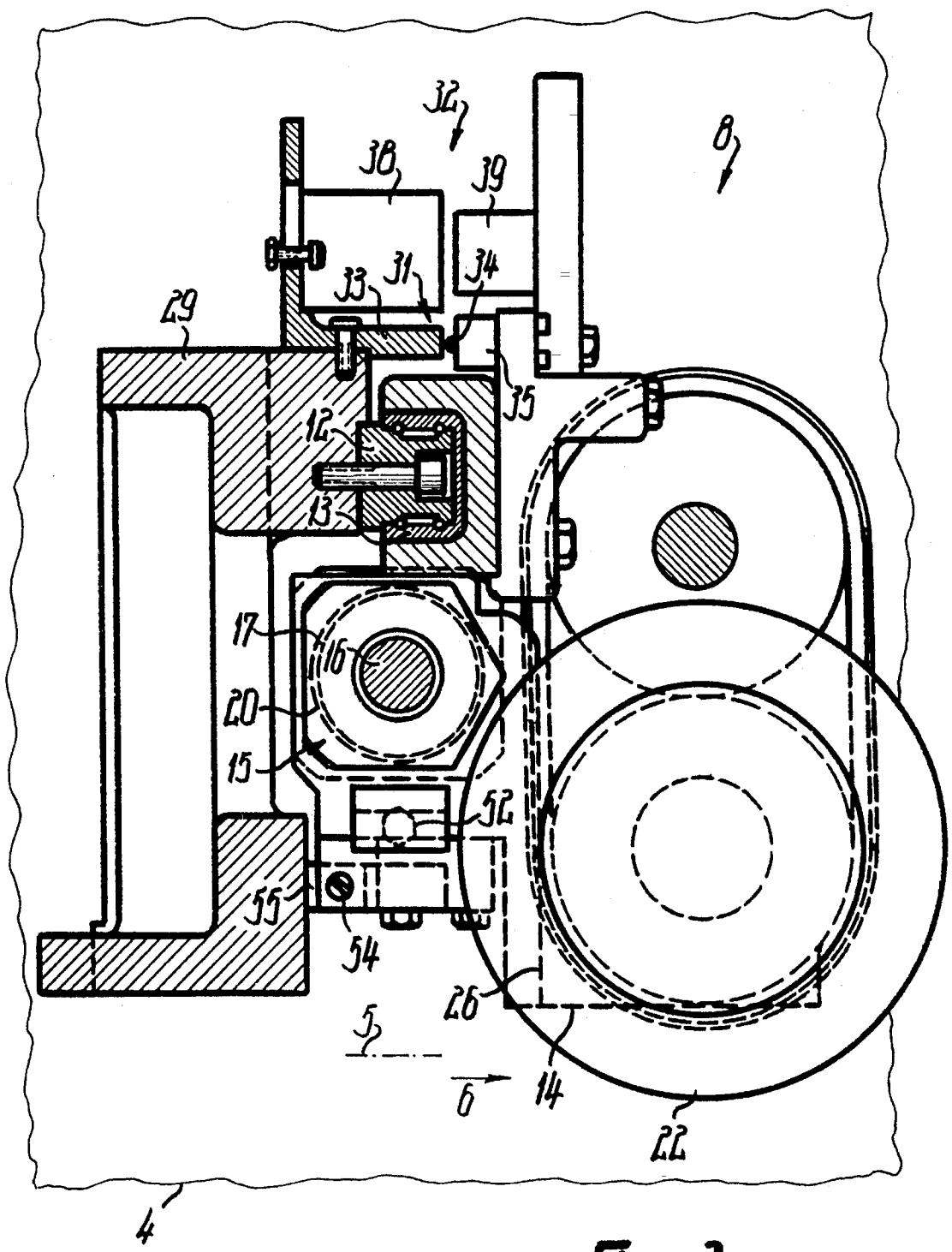
FIG. 3 shows a partial cross-section through the construction according to FIG. 1 on a larger scale and in slightly modified form.

The particular rail 12 is surrounded in U-shaped manner on three sides by the associated runner 13 and is rigidly fixed by a portion located outside the runner 13 to a crossmember 29 connecting the side walls 4 and which is substantially located on that side of the rail 12 which is remote from an axial plane of the tool 22 or 23 at right angles to the working plane 5, so that in the cross-section according to FIG. 3 the crossmember 29 can extend from close to the working plane 5 to beyond the remote side of the tool 22.

With a control device 30 the clutches 20 can be disengaged independently of one another and the working units 8, 9 adjusted. For applying the counterforce a loading or braking device 31 is provided, which is controlled by a path detection device 32, whereas the adjusting device 10 runs continuously with the spindles 16. The stopping device 31 has for each row of working units 8, 9 on the associated side of the working plane 5 a rod or web-like stopping base 33 in the form of a crossmember between the side walls 4, which is positioned immediately adjacent to the clutches 20 and the adjusting spindle 16 or the side of the running path of the runner 13 remote from the working plane 5 and can be rigidly fixed to the corresponding side of the crossmember 29.

Each working unit 8, 9 has an independently, separately controllable stopping member 34, which runs with a clamping face with a gap spacing along the narrow edge face of the stopping base 33 and with a fluid drive 35 can be resiliently pressed on said counterface. As a result the working unit 8, 9 is fixed in clearance-free manner relative to the frame 3 and around the longitudinal axis of the guide 11, a tilting moment corresponding to the contact pressure acts on the structure 14 and also braces the runner 13 with respect to the rail 12, so that the fixing or stopping action is further improved. However, it is also conceivable to form the stopping member by two facing members acting in opposition on the stopping base, so that there is no tilting moment. The stopping member 34 acts parallel to the working plane 5 in the running direction 6 and at right angles to the adjusting direction 21, so that any tilting movements of the tool 22, 23 are substantially parallel to the working plane and not at right angles thereto.

The braking or stopping face of the stopping member 34 is elongated and movable at right angles to its longitudinal direction in the adjusting direction 21. It is formed by a stiffened or thickened, central, rod-like portion of a membrane 36, whose bead-like, elastically resilient membrane part surrounds in ring-like manner and with constant spacing the adjusting member 34. The membrane 36 essentially forming one longitudinal side of a casing defines a pressure chamber 37 of only gap height located therein and which accompanied by the interposing of a control valve is so connected to a fluid-pressure supply that on pressurizing the pressure chamber 37 the stopping member 34 is extended into its stopping position. The arrangement can also be such that the stopping member 34, during the pressurizing of the pressure chamber 37, is brought into the release position and when the said chamber is pressureless into the braking position. At least one of the cooperating braking faces is elastically compressible under the braking pressure, namely in the case where the adjusting member 34 is formed by the material of the membrane 36, whereas the other stopping face is incompressible, so that a very high friction occurs. The longitudinal extension of the braking member 34 is parallel to that of the stopping base 33, so that the stopping member 34 always can be applied in an entire-surface manner.

The detecting device 32 is essentially located on the side described by means of the stopping device 31 or immediately adjacent to the side of the braking device 31 remote from the guide 11. It has a rod-like displacement transducer 38 passing between the side walls 4 and fixed to the frame and which is secured to the crossmember 29 and can form a preassembled subassembly with the stopping base 33. The stopping base 33 is formed by a leg of an angle section fixed by its outside to the crossmember 29 and whose other leg carries on its inside the displacement transducer 38 in such a way that it is continuously set and can be fixed at right angles to the adjusting direction 21 and to the working plane 5, as well as parallel to its surface. Each working unit 8, 9 has a separate path indicator 39, which is positioned facing with a small spacing the surface of the displacement transducer 38 remote from the fixing surface and is fixed to the structure 14 or to a plate-like connecting member through which can take place the fluid supply to the fluid drive 35. The transducer surface or the median plane of the gap formed by the latter with the indicator 39 is at right angles to the working plane 5 or parallel or approximately equiplanar to the braking surfaces of the stopping device 31 between the parallel axial planes of the spindle 16 and the tool 22, 23. The guide 11 is placed between the adjusting spindle 16 and the devices 31, 32.

The clutch 20 has two mirror-symmetrical securing or transmitting units 40 with which the spindle nut 17 can be fixed with respect to the associated structure 14 to prevent rotary movements about the axis of the spindle 16 and with which simultaneously the axial adjusting forces are transferred in clearance-free manner from the runner 17 to the structure 14 and the runner 17 is mounted in rotary manner with respect to the structure 14. Each transmission unit 40 is formed by an axial or thrust bearing outside circumferentially and spacedly between its two ends surrounding the runner 17 and whose two axially spaced and axially braced bearing rings form coupling members 41, 42 between whose facing faces are braced transmission members 43 in axial manner in the form of balls.

The two coupling members 41, 42, which like the transmission members are made from hardened steel, have for the engagement of the transmission members 43 on said faces cross-sectionally pitch circular, recessed, identical bearing faces 44, which pass continuously and uninterruptedly with constant radial spacing over the circumference, so that the transmission members 43 in each relative position with respect to the bearing faces have the same running resistances. The bearing faces 44 simultaneously serve as stopping or clamping faces and as engagement or disengagement faces of the clutch 20 in that below a predetermined transmission moment they are fixed relative to one another in the rotation direction and rotate against one another above a given transmission moment, the transmission members 43 then rolling thereon with a predetermined rolling resistance without there being any permanent or significant elastic deformations on the bearing faces 44 or transmission members 43.

The coupling members 41, 42 and the transmission members 43, as well as the particular transmission unit 40 or both transmission-units are axially braced against one another by a single bracing device 45, which is positioned on the outer circumference of the runner 17 and is supported with respect thereto. At one end the sleeve-like runner 17 has a spring abutment in the form of a collar 47 projecting over the outer circumference and on whose ring-like inner shoulder is supported with one end face a spring 46, e.g. a pretensioned cup spring bank. The other end of the spring 46 is directly supported on the adjacent driving coupling member 41 of the associated transmission unit 40. The remote coupling member 41 connected in non-rotary manner and continuously to the runner 17 of the other transmission unit 40 is supported by its outer end on a flange 48 provided as the second abutment and with an axial pretension.

For forming a setting device 49 the flange 48 is formed by a ring nut located on an external thread of the runner 17 and is therefore axially regularable for modifying the pretension of the spring 46 and fixable by self-locking in the particular setting position. The adjacent, optionally driven coupling members 42 axially spaced between the coupling members 41 are non-rotary relative to the structure 14, so that the runner 17, together with the coupling members 41 can rotate with respect thereto and the structure 14. As a result of the spring 46 said coupling members 42 are braced axially against one another and with respect to the structure 14. The bracing device 45 consequently acts on the engaging rolling and bearing faces of the transmission units 40. The bearing faces 44 have a larger radial spacing from the spindle axis 50 than the interengaging pitch or thread elements of the spindle 16 and the runner 17.

If the adjusting spindle 16 rotates and the stopping device 31 is in the release position, then the clamping action between the bearing faces 44 and the transmission members 43 is so large that it cannot be overcome by the friction between the threads of the means 15, the runner 17 remains non-rotary with respect to the structure 14 and accompanied by the transmission of the axial adjusting movement to the structure 14 there is a carrying along in the adjusting direction solely via the transmission units 40 or the bearing faces 44 and the transmission members 43 along the spindle 16. As soon as a correspondingly high counterforce acts on the structure 14 or the runner 17, the clamping resistance between the transmission members 43 and the bearing faces 44 is overcome in such a way that the coupling members 41 rotate with a simultaneous rolling of the members 43 against one another, namely together with the runner 17 and the spindle 16, so that the structure remains in the particular position. As soon as the counterforce is removed, the coupling 20 carries along the structure 14 again in the described manner. The structure 14 could also be rotatably mounted or in the form of a driven or driving part of the overload clutch, without an axial adjusting movement being necessary.

Instead of being brought about by the stopping device 31, the counterforce can also be provided by an arresting device 55 through which the adjusting movement of the particular structure 14 is positively limited. For example it would be possible to provide stops 52 for the reciprocal stopping of adjacent structures 14 and/or stops 54 for stopping the particular structure 14 on the frame 3, particularly on the crossmember 29, the stops 52, 54 being formed by the same stops or separate stops. The particular stop 52 or 54 is appropriately provided with a shock absorber 53, whose absorbing member, upstream of the stop face, runs onto the counterstop and then resiliently absorbs the adjusting movement of the structure 14 until the stop face has stop contact. The stops 52, 54 are appropriately located on the side of the guide 11 facing the working plane 5, the servodrive 15 or the devices 31, 32, the counterstop 55 for the stop 54 being located on the side of the crossmember 29 facing the tool 22, 23. Through the stop device 5.1, in conjunction with the clutches 20, there is also a security against adjusting movements extending beyond the outermost end positions and which could lead to damage, so that there is no need for a separate end position disconnection, e.g. by stopping the adjusting device 10. If during its adjusting movement the working unit 8, 9 runs against an obstacle, then it stops immediately without causing damage.

For setting the working units 8, 9 from a preceding operating position initially the tools 22 are axially raised from the tools 23 in the regulating direction 25 and then in the regulating direction 27 are extended from the working plane 5. Then, by putting into operation the adjusting device 10 and via the slip-free toothed belt drive 19, all the units 8, 9 are regulated in the direction of one of the side walls 4 until the in each case furthest forward unit 8 or 9 is fixed by the counter-stop 55 and the associated following units 8 or 9 are fixed with respect to said furthest forward unit with their stops 52. Instead of moving all the juxtaposed units 8 or 9 in a row into a reference position, several or all the units could be directly fixed with respect to the frame 5 by a counterstop 55, so that said units would not have to strike directly on an upstream unit in the adjusting direction and instead would pass into their reference position following a much shorter adjusting path.

Starting from said reference position the units 8, 9 are once again simultaneously moved in the opposite adjusting direction 21 until the particular unit 8, 9 has reached its predetermined, setting position. On reaching this position, the stopping device 31 is suddenly engaged and the unit 8 or 9 is fixed, whilst further associated units 8 or 9 can still continue to perform their adjusting movement until they also have successively reached the associated setting position and are fixed therein. The two units 8, 9 of the machining unit 7 are appropriately so synchronously adjusted with one another that in the adjusting direction 21 they always assume the predetermined relative position for their cooperation, so that their two separate stopping devices 31 can be simultaneously engaged by means of a common control signal or control valve. Thus, per machining unit 7 it is only necessary to have for one of the working units a common detecting device 32 or a common displacement transducer 38, which controls the two working units 8, 9 or the associated clutches 20 and stopping devices 31. Appropriately only one of the displacement transducers 38 is associated with all the working units 9, so that they only require a single indicator 39 and the displacement transducer 38 can be arranged in protected manner below the working plane 5. Following setting the tools 22, 23 can be returned in reverse into reciprocal engagement in directions 27, 25.

The crossmember 29 or the guide 11 for the working units 9 can be constructed in the same way as those for the working units 8, but with respect to the described arrangement thereof is appropriately rotated about its longitudinal axis by 90°, so that the tool 23 is above the crossmember, the guide, the servodrive, the stopping device and/or the detecting device and the crossmember is below the same. The indicated characteristics such as positions, orientations or equalities can, other than described, also be provided in a significantly differing manner.

We claim:

1. A power transmission for driving at least one driven unit (8, 9) over a driven path comprising:

at least one clutch (20) including a drive input (16), a drive output (14) and a drive connection for operably transmitting a given driving momentum from said drive input (16) to said drive output (14) when said clutch (20) is in a transmitting state; and control means (30) for switching said clutch (20) between said transmitting state and a released state in which such transmission of said given driving momentum is interrupted, said clutch (20) having transmission characteristics including a driving path of said drive output (14) and a driving time while said clutch (20) is in said transmitting state, wherein said control means (30) include a loading device (31) for operably positively setting said drive output (14) under a control load substantially counteracting said driving momentum, said control means (30) positively and variably controlling said loading device (31) as a function of at least one of said transmission characteristics to thereby provide varying first and second loading states, said loading device (31) positively triggering said clutch (20) to be in said transmitting state when said loading device (31) is in said first loading state and to be in said released state when said loading device (31) is in said second loading state.

2. The power transmission according to claim 1, wherein said loading device (31) includes a loading member (34, 52, 54), said loading member (34, 52, 54) being continuously moveable to perform along the driving path a setting motion at ny position on the driving path common with said drive output (14) and said driven unit (8, 9) defining continuously chaining positions, said loading device (31) being switchable from said first loading state to said second loading state in said any position in an abrupt impulse to thereby interrupt said drive connection at any point said driven unit (8, 9) reaches along said driving path, said driving path extending parallel to said drive input (16), and said clutch (20) interrupting said drive connection.

3. The power transmission according to claim 1, wherein said control means (30) include a detecting means (32) for detecting at least one of said transmission characteristics; at a preset value of said at least one of said transmission characteristics, said loading device (31) being automatically switched by said control means (30) from said first loading states to said second loading state, said preset value being variable.

4. The power transmission according to claim 1, wherein said power transmission is provided for displacing and positionally variably adjusting said at least one driven unit (8, 9) with respect to a mounting base (3), thereby providing an adjusting device (10), said loading device (31) including a loading member (34, 52, 54), a position detecting means including a position detecting indicator (39) being provided for detecting positioning of said at least one driven unit (8, 9) with respect to said mounting base (30); said at least one clutch (20), said loading member (31), said position detecting indicator (39) and said at least one driven unit (8, 9) being commonly movable over said driving path when driven via said clutch (20).

5. The power transmission according to claim 4, wherein said clutch (20) includes momentum limiting means, which in said transmitting state, interconnect said drive input (16) and said drive output (14), for transmitting drive motion from said drive input (16) to said drive output (14) and which interrupt such transmission when a predetermined momentum load is reached, said momentum limiting means including clutch members (41, 42) interconnected by a clamping friction transmitting said drive motion and thereby loaded by said driving momentum; when in said transmitting state, said clutch members (41, 42) being positionally secured together by said clamping friction; said driven path being linear.

6. The power transmission according to claim 5, wherein said clutch members (41, 42), roller means being provided on said clutch members, said roller means and having rolling faces interengaging by a clamping pressure to define a holding force counteracting said driving momentum; in said release state, said clutch members (41, 42) being reciprocally movable by overcoming said holding force.

7. The power transmission according to claim 5, wherein a maximum transmitting torque is defined by said momentum limiting means, said maximum transmitting torque being substantially continuously variable by varying a substantially resilient tension.

8. The power transmission according to claim 5, wherein said loading device (31) is provided by at least one friction brake including a brake member (34); said friction brake (31) being positively transferable from said first loading state to said second loading state and back to said first loading state; commonly with said driven output (14), said brake member (34) being continuously moved in a setting motion when said clutch is in said transmitting state and said drive input (16) is driven, said clutch (20) being provided for interrupting said drive connection.

9. The power transmission according to claim 8, wherein said friction brake has first and second braking faces provided for frictionally interengaging; said first braking face being at least one of:

oblong and elongated, provided by a membrane of a fluid cylinder (36), and displaceable over a length extension of said first braking face in a direction transverse to said length extension to change from said first to said second loading state, a stopping rail (33) including said second braking and extending substantially over said driven path of said first braking face, said braking face running along said stopping rail (33).

10. The power transmission according to claim 5, wherein said power transmission is provided for operationally driving said position adjusting device (10) for adjusting at least two separate driven units (8, 9) positionally on adjusting paths, said position detecting means including a detecting device (32) commonly controlling said at least two separate driven units (8, 9), said clutch being provided for interrupting said drive connection.

11. The power transmission according to claim 10, wherein said at least one driven unit (8, 9) includes a plurality of at least two driven units (8, 9), said at least two driven units (8 or 9) being commonly transferable into said initial position when in a reciprocally abutted position, said control means (30) being provided for displacing said at least two driven units (8, 9) from said initial position into separate operating and setting positions in path-dependent control and for separating said at least two driven units (8 or 9) out of said abutted position.

12. The power transmission according to claim 11, wherein said first and second working units (8, 9) are mounted on separate adjusting guides (11), but are adjustable transverse to said running direction (6) with a common adjusting drive (18).

13. The power transmission according to claim 11, wherein said control means (30) include an adjusting device (10) for adjustingly displacing said working units (8, 9), at least one of said first machining tools (22) being adjustably mounted independently from operation of said adjusting device (10) with respect to at least one of said second machining tool (23) in at least one of a direction (25) parallel, and a direction transverse to said adjusting direction.

14. The power transmission according to claim 10, wherein said power transmission and said driven unit (8, 9) are provided on a basic machine frame (3), at least one of said reference stop (55) being provided on at least one of said machine frame (3), and said driven unit (8, 9).

15. The power transmission according to claim 4, wherein a pitch drive is provided for transmitting at least part of said driving momentum, said clutch (20) having a basic body (17) provided with a pitch member of said pitch drive (15), said pitch member drivingly engaging said drive input (16).

16. The power transmission according to claim 15, wherein said basic body (17) is substantially provided by a sleeve (17) having first and second circumferential surfaces including an inner circumference and an outer circumference, said pitch member being provided on said first circumferential surface and roller members (43) for transmitting said driving momentum being provided on said second circumferential surface, in axially distributed positioning at least two of:

a compression spring (46), a support collar (47), two reciprocally braced rings loaded against said roller members (43), and a counterpressure member (48) for said compression spring (46)

being provided on one of said first and second circumferential surfaces.

17. The power transmission according to claim 4, wherein said clutch (20) is an overload clutch automatically engaging and disengaging at a predetermined braking momentum counteracting said driving momentum, when in said second loading state, said loading device (31) effecting said braking momentum.

18. The power transmission according to claim 17, wherein for transmitting said driving momentum said clutch (20) has at least one rolling transmission member (43) acting substantially free of slip motion and catch resistance, at least one of said transmission member (43) engaging on counterfaces (44).

19. The power transmission according to claim 18, wherein each of said counterfaces (44) provides a substantially continuous extension of a bearing face provided for displaceably mounting at least one of said transmission member (43).

20. The power transmission according to claim 18, wherein for providing a guided motion at least one of said counter faces (44) provides a guide face centering at least one of said transmission member (43) substantially free of motion play transverse to said guided motion.

21. The power transmission according to claim 18, wherein an axially grooved roller bearing including a plurality of said rolling transmission member (43) is provided for transmitting said driving momentum, said plurality of rolling transmission members (43) including juxtaposed rollers, said rolling transmission members (43) including juxtaposed members (43) interspaced by a spacing, said spacing between at least two of said juxtaposed rollers (43) being continuously substantially constant.

22. The power transmission according to claim 18, wherein at least one of said counterfaces (44) has a bearing face free of steps continuously interconnecting first and second bearing portions, said first bearing portion stationarily holding said at least one transmission member (43) when said clutch (20) is in said transmitting state and said second bearing portion being provided for displaceably mounting said transmission member (43) when said clutch (20) is in said released state.

23. The power transmission according to claim 4, wherein said clutch (20) is axially movably driveable with said drive input (16), said clutch (20) being guided with radial and axial motion play with respect to said drive input (16) provided by a spindle (16), said clutch (20) being provided for interrupting said drive connection.

24. The power transmission according to claim 23, wherein at least one substantially linear guide (11) separate and spaced from said spindle (16) is provided, said clutch (20) being guided on said guide (11) in a radial direction with a more limited motion play than with respect to said spindle (16), said spindle (16) and said guide (11) being located directly adjacent to one another in a common axial plane, said axial plane being oriented substantially at right angles to a working plane (5, 28) defined by said driven unit (8, 9), said driven unit (8, 9) including said drive output (14) and a working unit with at least one working tool (22, 23) defining said working plane.

25. The power transmission according to claim 1, wherein said at least one of at least one clutch (20) has a transmission member (43), said transmission member (43) being mounted between opposing clamping faces (44) having circumferences, at least one of said clamping faces (44) being constructed as ring depressions free of pitch gradients over the entire circumferences of the clamping faces.

26. The power transmission according to claim 1, wherein said control means (30) has a detecting device (32) for detecting positions within an adjusting path of an adjusting device (10) driven by said power transmission, said detecting device (32) operating in substantially contact-free manner by an energy field, providing characteristic of a magnetic field.

27. The power transmission according to claim 1, wherein at least one basic path reference (38) is provided for continuously determining positions within an adjusting path, at least one of said path reference (38) being provided by an oblong rail substantially parallel to said adjusting path and extending substantially entirely over said adjusting path.

28. The power transmission according to claim 1, wherein said at least one driven unit (8, 9) includes two cooperating first and second working units (8, 9) commonly providing a machining unit (7) having first and second machining tools (22, 23) for commonly machining a substrate running in a running direction, said working units (8, 9) being adjustable transverse to said running direction (6) and providing a plurality of separate said machining unit (7), thereby defining an adjusting direction.

29. The power transmission according to claim 1, wherein for determining at least one basic reference and initial position of said driven unit (8, 9), at least one reference stop 952, 54, 55) is provided, said control means (30) including said reference stop (52, 54, 55).

30. The power transmission according to claim 1, wherein said transmitting state includes a substantially slipfree transmitting state, means being provided for transferring said clutch (20) from said transmitting to said release state substantially without increases of said driving momentum, said drive input including a driving member (16) and said at least one clutch (20) including a plurality of independently operable clutch units (20) each having an individual drive connection and being commonly driveable with said driving member (16), each of said clutch units (20) being independently transferable from said transmitting state to said release state to thereby interrupt its individual drive connection.

31. The power transmission according to claim 1, wherein said drive input (16) includes a driving member (16) and said at least one clutch (20) includes a plurality of independently operable clutch units (20) commonly driveable with said drive member (16), a plurality of driven units (8, 9) being provided and each of said plurality driven units (8, 9) including an individual clutch unit (20) and an individual loading device (31) separate from the other said driven units (8, 9), means being provided for continuing drive motion of said driving member (16) when any one of said clutch units (20) is in said released state and thereby decouples its driven unit (8, 9) from said driving member (16), thereby each of said driven units being independently driveable until its loading device (31) transfers to said second loading state at a variable point of said driven path, at least one of said clutch units (20) being operable to separately and independently interrupt said drive connection provided to connect its associated driven unit (8, 9) with said driving member (16).

\* \* \* \* \*